United States Patent
Klemp

[19]

[11] Patent Number: 5,829,774
[45] Date of Patent: *Nov. 3, 1998

[54] COMBINATION STEP AND BUMPER ASSEMBLY AND METHOD

[76] Inventor: Scott C. Klemp, 316 Montrose Dr. #C, Folsom, Calif. 95630

[*] Notice: This patent issued on a continued prosecution application filed under 37 CFR 1.53(d), and is subject to the twenty year patent term provisions of 35 U.S.C. 154(a)(2).

[21] Appl. No.: 581,980

[22] Filed: Jan. 2, 1996

[51] Int. Cl.⁶ .................................................. B60D 1/07
[52] U.S. Cl. ........................ 280/507; 280/164.1; 293/117
[58] Field of Search ................. 280/415.1, 507, 280/511, 495, 504, 432, 163, 164.1; 224/519, 521, 527; 293/117, 120; D12/203

[56] References Cited

U.S. PATENT DOCUMENTS

| | | | |
|---|---|---|---|
| D. 225,160 | 11/1972 | Thomas | D12/203 |
| D. 315,134 | 3/1991 | Springer | D12/203 |
| D. 370,452 | 6/1996 | Beasley | D12/203 |
| 3,501,190 | 3/1970 | McCrea | 293/117 |
| 3,730,556 | 5/1973 | Aldape et al. | 280/164.1 |
| 3,796,333 | 3/1974 | Goldstein | 224/527 X |
| 4,138,152 | 2/1979 | Prue | 293/117 |
| 4,671,439 | 6/1987 | Groeneweg | 224/521 X |
| 5,135,274 | 8/1992 | Dodd | 293/117 |
| 5,603,178 | 2/1997 | Morrison | 280/507 X |

FOREIGN PATENT DOCUMENTS 2 242 659  10/1991  United Kingdom ................ 280/164.1

*Primary Examiner*—Brian L. Johnson
*Assistant Examiner*—Avraham H. Lerner

[57] ABSTRACT

A combination removable bumper and hitch apparatus is disclosed. The apparatus contains a removable bumper that may be releasably coupled to a hitch located in the rear portion of a vehicle, for concealing the hitch from view and for providing a step support for a user of the vehicle.

8 Claims, 1 Drawing Sheet

COMBINATION STEP AND BUMPER ASSEMBLY AND METHOD

BACKGROUND OF THE INVENTION

1. Field of Invention

This invention relates generally to an apparatus and method involving vehicle bumpers and hitch apparatuses including methods therefor and, more specifically, to an apparatus and method for a combination removable vehicle bumper and vehicle hitch apparatus and method which apparatus is mounted directly onto a vehicle.

2. Background of the Invention

Hitches are a common automobile accessory. Virtually always mounted or welded onto the bottom rear of an automobile, van or truck below the back bumper, a hitch allows a user of a vehicle to tow a wide variety of objects, including trailers and cars.

To use a typical vehicle hitch, the user must generally insert into the opening of the hitch a shaft, at the end of which shaft is a top-mounted steel ball. The shaft/steel ball apparatus generally extends beyond the rear vehicle bumper, and it is to the steel ball that the user attaches a complimentary member on the object to be towed. When the hitch is not in use, a large portion of the hitch apparatus, and most prominently the hitch opening, is exposed to view.

A hitch-owner has a number of options for caring for the unused hitch. The user can leave the shaft/steel ball apparatus in place; however, this exposes the shaft/steel ball to possible theft and, additionally, the steel ball is also exposed to possible damage in the event of even a minor accident. A second, more popular option is to simply remove the shaft/steel ball apparatus, leaving exposed the hitch opening. This option has the benefit of protecting the ball from damage and theft, but leaves the relatively unattractive hitch opening exposed to view. There are also hitches which feature a small cover for the hitch opening, which cover may removed for insertion of the ball apparatus. These covers have the advantage of concealing the hitch opening from view; however, a portion of the remaining hitch apparatus is still generally visible under the rear bumper.

Therefore, a need existed for an apparatus and method for concealing a hitch apparatus that is not in use, including the portion of the hitch apparatus other than the hitch opening. The improved apparatus and method must also be attractive. Moreover, the improved apparatus and method must be functional; i.e., it must serve a purpose other than the merely cosmetic one of concealing the hitch apparatus from view. In this regard, vehicle owners commonly have a need to climb onto their vehicles in order to, for example, load items into the rear portion of the vehicle (particularly with trucks) or to load items onto the roof of the vehicle. Some vehicles, including many pickup-type trucks, have rear bumpers that extend beyond the rear of the vehicle and that are designed to be stepped on by the vehicle owner for the kinds of purposes listed above. However, many vehicles, including for example mini-vans, do not generally have extended rear bumpers that permit the use of the bumper as a step ladder. Thus, the desired apparatus and method must also be capable of performing the function of an extended bumper; i.e., of being able to accommodate a person that wishes to step or stand on the apparatus for purposes of loading or obtaining access to the rear or top portion of the vehicle.

SUMMARY OF THE INVENTION

It is an object of the present invention to provide a combination removable vehicle bumper and hitch apparatus and method.

It is another object of the present invention to provide an improved apparatus and method for concealing a hitch apparatus when not in use.

It is a further object of the present invention to provide an apparatus and method for providing a removable step support that incorporates a vehicle hitch and bumper.

BRIEF DESCRIPTION OF THE PREFERRED EMBODIMENTS

In accordance with one embodiment of the present invention, a combination removable vehicle bumper and hitch apparatus is disclosed. The apparatus is comprised of an elongated horizontal member having a configuration of a vehicle bumper and means located on the elongated horizontal member for removably coupling the elongated horizontal member to a vehicle hitch located on a vehicle. Foot placement means are located in a top portion of the elongated horizontal member for permitting a person to step onto the elongated horizontal member while the elongated horizontal member is attached to the vehicle hitch.

In accordance with another embodiment of the present invention, an improved method for providing a combination removable vehicle bumper and hitch apparatus is disclosed. The method comprises the steps of: providing an elongated horizontal member having a configuration of a vehicle bumper and providing means located on the elongated horizontal member for removably coupling the elongated horizontal member to a vehicle hitch located on a vehicle. Foot placement means are located in a top portion of the elongated horizontal member for permitting a person to step onto the elongated horizontal member while the elongated horizontal member is attached to the vehicle hitch.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 3:
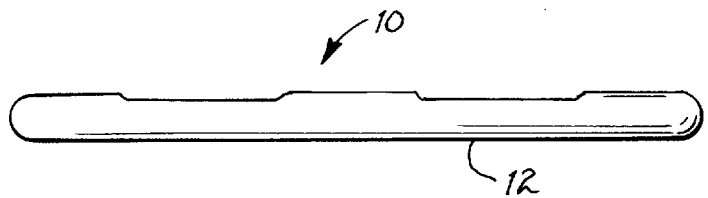
FIG. 3 is a rear view of the apparatus of FIG. 1.
Figure 1:
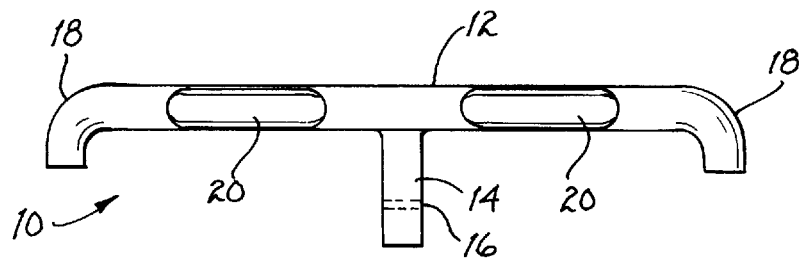
FIG. 1 is a top view of the combination removable vehicle bumper and hitch apparatus of the present invention.
Figure 2:
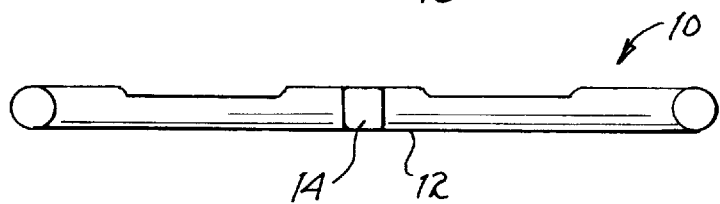
FIG. 2 is a front view of the apparatus of FIG. 1.

Referring to the embodiment of FIGS. 1-4, reference number 10 refers generally to the combination removable vehicle bumper and vehicle hitch of this invention. Referring specifically to FIGS. 1–3, the combination removable vehicle bumper and vehicle hitch 10 comprises a substantially horizontal portion 12. At substantially the center of the horizontal portion 12, and oriented at substantially a 90 degree angle thereto, is a shaft 14. An opening 16 extends through shaft 14, so that a pin (not shown), may be inserted therethrough when the shaft 14 is inserted into a hitch opening (See FIG. 4). At the two ends of the horizontal portion 12, and extending in the same direction as the shaft 14, there are two curved portions 18. On the top of the substantially horizontal portion 12, and located on either side of the shaft 14, are two depressions 20. The depressions 20, the surface of which may be covered with a skid-resistant material (not shown) or with small protrusions designed to reduce skidding (not shown) are placed so as to receive the feet of a user desiring to step or stand on the combination removable vehicle bumper and vehicle hitch 10.

Figure 4:
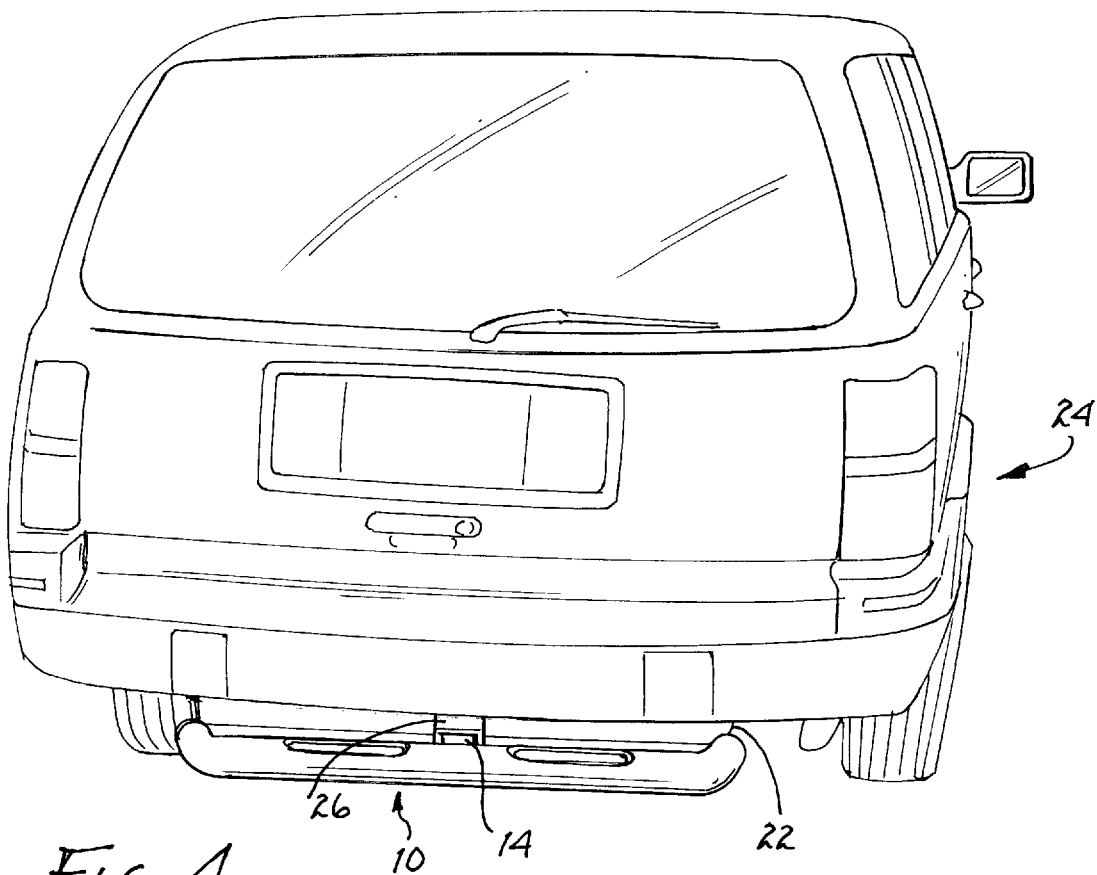
FIG. 4 is a perspective view of the apparatus of FIG. 1 as installed on the rear portion of a vehicle.

Referring to FIG. 4, the combination removable vehicle bumper and vehicle hitch 10 is shown fully assembled on a vehicle 24. The horizontal portion 12 is releasably connected to hitch 22 by the insertion of the shaft 14 into the opening 26 of the hitch 22, and the positioning of the shaft 14 relative to the opening 26 so that a pin (not shown) may be inserted through opening 16 and a corresponding opening (not shown) in the opening 26 of the hitch 22.

While the invention has been particularly shown and described with reference to preferred embodiments thereof, it will be understood by those skilled in the art that the foregoing and other changes in form and details may be made therein without departing from the spirit and scope of the invention.

We claim:

1. A combination removable vehicle bumper and hitch apparatus mounted to a vehicle comprising, in combination:

an elongated substantially tubular horizontal vehicle bumper including foot placement means on a top portion thereof; and means located on the elongated substantially tubular horizontal vehicle bumper for removably coupling said elongated substantially tubular horizontal vehicle bumper to a vehicle hitch located substantially in the center of the rear end portion of the vehicle, said vehicle bumper substantially abutting the rear end portion of the vehicle when coupled to the hitch to permit a person to step on the foot placement means to load and obtain access to the rear end and top portions of the vehicle.

2. A combination removable vehicle bumper and hitch apparatus in accordance with claim 1 wherein said elongated substantially tubular horizontal vehicle bumper is selected from the group consisting of steel, rubber, plastic and fiberglass.

3. A combination removable vehicle bumper and hitch apparatus in accordance with claim 1 wherein said foot placement means comprises at least one depression in said elongated substantially tubular horizontal vehicle bumper.

4. The combination removable vehicle bumper and hitch apparatus of claim 1 wherein said vehicle is an automobile.

5. A method for providing a combination removable vehicle bumper and hitch apparatus comprising the steps of:

providing an elongated substantially tubular horizontal vehicle bumper including foot placement means on a top portion thereof; and providing means located on the elongated substantially tubular horizontal vehicle bumper for removably coupling said elongated substantially tubular horizontal vehicle bumper to a vehicle hitch located substantially in the center of the rear end portion of the vehicle, said vehicle bumper substantially abutting the rear end portion of the vehicle when coupled to the hitch to permit a person to step on the foot placement means to load and obtain access to the rear end and top portions of the vehicle.

6. The method of claim 5 further comprising the step of providing said elongated substantially tubular horizontal vehicle bumper selected from the group consisting of steel, rubber, plastic and fiberglass.

7. The method of claim 5 wherein the step of providing said foot placement means further comprises the step of providing at least one depression in said elongated substantially tubular horizontal vehicle bumper.

8. The method for providing a combination removable vehicle bumper and hitch apparatus of claim 5 wherein said vehicle is an automobile.

\* \* \* \* \*